Patented Apr. 3, 1951

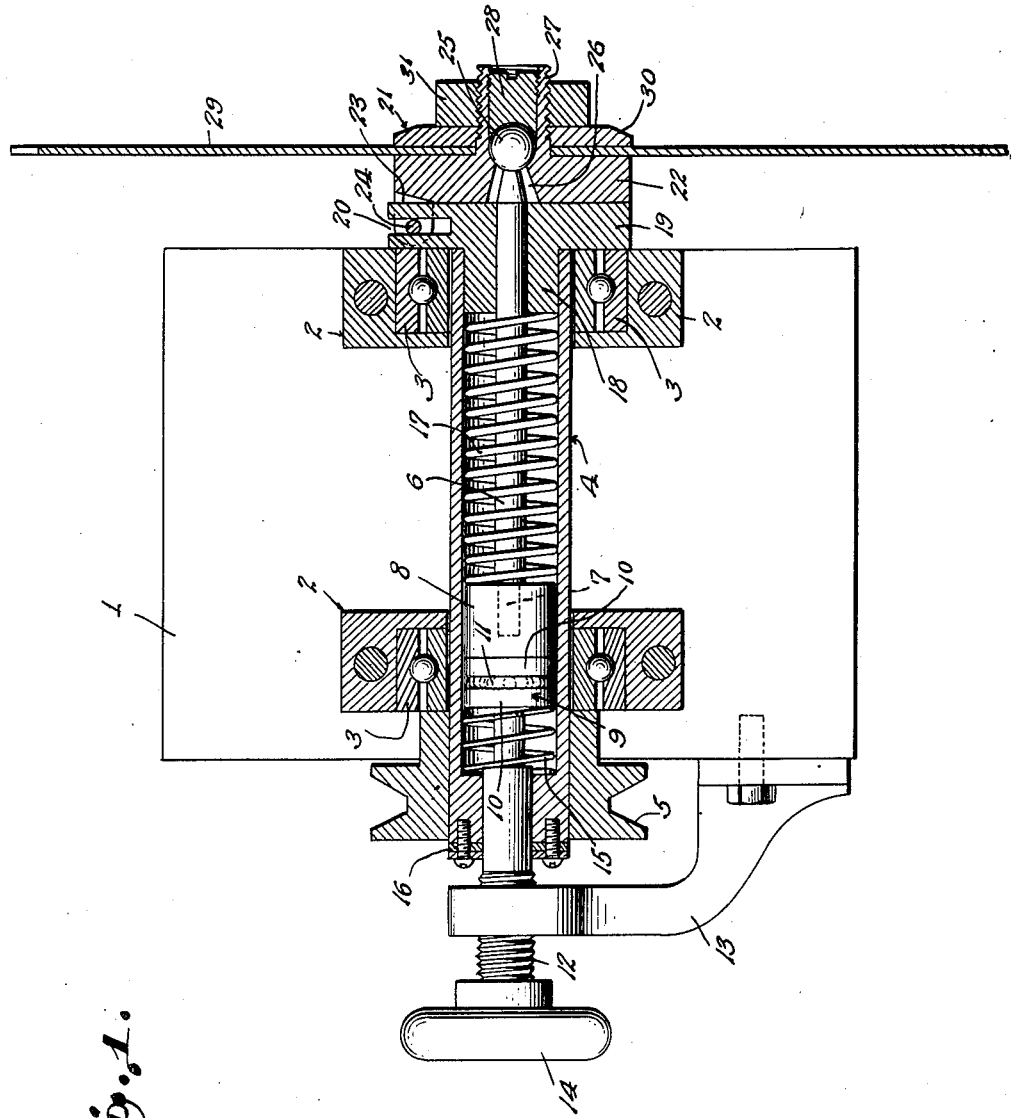

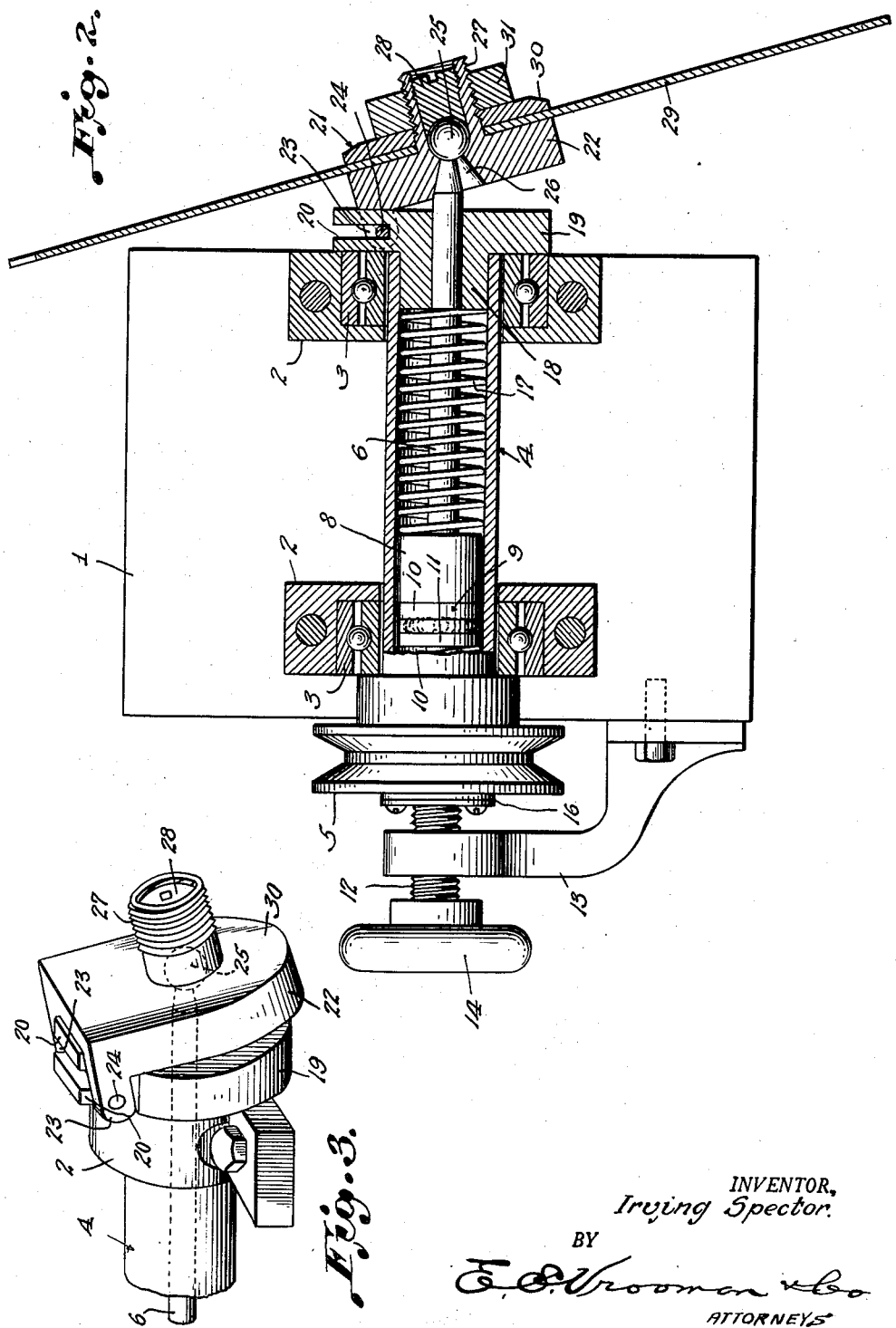

2,547,418

UNITED STATES PATENT OFFICE 2,547,418

INCLINABLE SAW HUB AND ARBOR

Irving Spector, Miami, Fla.

Application May 4, 1948, Serial No. 24,928

3 Claims. (Cl. 144—238)

This invention relates to improvements in inclinable cutting disc hubs as applied specifically to the art of woodworking and in general to other arts in which a cutting or grooving mechanism of this type is applicable. It is well known to those versed in the art, that a rotary circular saw disc may be offset upon its mounting shaft so as to impart a wobble to it as it rotates, thereby making it capable of cutting a groove wider than the thickness of the saw disc itself. Whereas, in the existing methods of accomplishing this, the inclination of the disc is possible only when the saw hub is at rest, due to the inherent necessity for applying suitable wrenches or other tools to the adjustable portions of the said hub, and whereas the present attached measuring scales, which form an integral part of these present hubs become inaccurate, when the originally calibrated cutting disc is altered as to diameter, thickness, or amount of tooth set, it has become necessary for the reasons set forth to adopt the laborious procedure of alternately adjusting the saw's inclination, making a trial cut, and bringing the saw's rotation to a halt in order to make the final adjustments to it consistent with the accuracy of the width of groove required.

An object of this invention, therefore, is to provide a mechanism capable of producing and maintaining an inclined position in a rotary cutting disc, by means which are controllable independently of the said cutting disc's rotation.

Another object of this invention is to provide a lubrication chamber within the hollow spindle, in combination with a device of this type, whereby the thrust bearing and inner cooperating parts are assured of a supply of lubricant.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a longitudinal, sectional view through the central part of the mechanism constructed in accordance with the present invention, showing the inclinable hub in its normal position, while Figure 2 is substantially a similar view, showing the hub in an open or adjusted position.

Figure 3 is a fragmentary, perspective view of the mechanism, showing particularly the hub-end thereof.

Referring to the drawings, in which the preferred embodiment of this invention is illustrated, 1 designates the housing or any suitable support for the mechanism. On the housing 1 are secured two bearing supports 2. In each bearing support 2 are suitable ball bearings 3. Rotatably supported by said ball bearings 3 is a hollow spindle 4. To rotate spindle 4 a belt wheel 5 may be employed, but I do not limit myself to this type of means for imparting power of rotation to the hollow spindle 4. Within spindle 4 is a slidable shaft 6. The inner end of shaft 6 has an extension 7, which extension extends into the pilot sleeve 8. Within the spindle 4 and bearing against one end of the pilot sleeve 8 is a ball thrust bearing 9. This thrust bearing 9 comprises two sections 10, between which is a race ring 11; mounted within ring 11 are ball bearings, indicated by dotted lines in Figures 1 and 2.

A threaded rod 12 is mounted on bracket 13, which bracket is secured to the housing or support 1. This rod 12 is provided on its outer end with a hand grip 14. The inner end of the rod 12 extends through the outer end of the spindle 4 and is capable of pressing against the ball thrust bearing 9, when rod 12 is rotated, for the purpose hereinafter described. A light compression spring 15 is mounted in the spindle 4 around the inner end of the rod 12, as shown in Figure 1. A seal device 16 is detachably mounted on the end of the spindle 4 and is around the rod 12. The purpose of the seal device 16 is to prevent lubricant from seeping out of the hollow spindle 4.

Within the hollow spindle 4 is a compression spring 17. This spring 17 surrounds a portion of shaft 6, with one end bearing against the pilot sleeve 8, and its other end bears against pilot sleeve 18 that is an integral part of the flange section 19. The flange section 19 is provided with a bifurcation 20.

A saw hub 21 is provided comprising a primary section 22, which is provided with two bosses 23. A rod or pin 24 is mounted on these bosses and is normally positioned in the bifurcation 20. The shaft 6 is provided with an integral ball 25 that is seated in the primary section 22. When assembling the mechanism, the aperture 26 in primary section 22 allows the shaft 6 to be threaded therethrough into the spindle 4, with the ball 25 seated, as clearly shown in the drawings. The primary section 22 is provided with an integral hollow externally threaded extension 27. The ball 25 partly extends into the extension 27. A screw plug 28 is in extension 27 and bears against a portion of ball 25, holding the ball in its operatable position. A disk saw 29 is mounted on extension 27 and a washer 30 is on extension 27 against said disk saw 29. A nut 31 is threaded on extension 27 against washer section 30.

When the rod 12 is not engaging the thrust bearing 9, the powerful spring 17 will be exerting pressure on pilot sleeve 8 sufficient to hold the saw hub 21 in a closed position, as shown in Figure 1. When the operator rotates rod 12 to cause it to engage the ball thrust bearing 9, with an inward pressure, this will overcome, to a sufficient extent, the action of spring 17, resulting in the ball end of the sliding shaft 6 forcing the saw hub 21 outwardly, as shown in Figure 2. The outward swinging movement of the saw hub 21 can be controlled by the operator so that an accurate and desired adjustment of the saw hub 21 will result. When the operator rotates the rod 12 to cause it to move outwardly, free from the ball thrust bearing 9, then the spring 17 will close the saw hub 21, Fig. 1.

It will be understood that the ball-shaped extremity of the sliding shaft 6 provides a flexible coupling medium by means of which a sliding motion applied to the said shaft toward the right is made for producing and maintaining an inclined position in the inclinable saw hub 21, the said sliding movement being produced externally and capable of gradual adjustment, while the cutting disk 29 and its cooperating parts are revolving.

The mechanism by which the inclinable hub 21, with its attached cutting disk 29, is made to vary the width of the groove which it is capable of cutting from the thickness of the saw disk itself to the maximum width within the scope of the mechanism is hereinbefore specifically described.

The adjustment of the saw hub 21 can be made with effectiveness whether the disk is rotating or at rest.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a support, of a pair of bearing supports on said support, a rotatable, hollow spindle on said bearing support, a pulley fixedly secured to one end of said spindle, a flange section provided with a pilot sleeve, said pilot sleeve being fixedly mounted in one end of said spindle, said flange section being provided with a bifurcation, a saw hub comprising a primary section adapted to pivot on said flange section, said primary section being provided with parallel bosses and with a ball receiving and holding socket opening towards said hollow spindle, a pin in said bifurcation and mounted on said bosses, said primary section being provided with an externally threaded extension, a screw plug in said threaded extension closing the outer end of said socket, a threaded rod and means supporting said rod on said support, said threaded rod extending through the end of said spindle opposite the pilot sleeve and having threaded engagement with said means, a slidable shaft in said spindle and extending through said pilot sleeve and flange section and provided at its outer end with a ball, said ball retained in the socket of said primary section and engaging against said screw plug, a second pilot sleeve slidable in the last mentioned end of said spindle, said shaft having its inner end secured in said second pilot sleeve, a slidable ball thrust bearing in said spindle between said rod and said second pilot sleeve, a powerful compression spring in said spindle around said shaft with one end pressing against the pilot sleeve of said flange section and its other end pressing against said second pilot sleeve on the inner end of said shaft, and a light compression spring in said spindle around the inner end of said threaded rod and bearing at one end against a shoulder in said last mentioned end of the spindle and the other end bearing against the side of the ball thrust bearing, substantially as shown and described.

2. In a mechanism of the class described, a tubular spindle having an internal guide bearing at each end, means rotatably supporting said spindle, a slidable thrust bearing in said spindle intermediate its ends, a flange projecting from the guide bearing at one end of the spindle, a saw hub resting against said flange and having hinge connection therewith at one side of said spindle, a rod extending through the guide bearing at the flange provided end of the spindle, a ball on the projecting end of said rod, said hub being provided with a socket wherein said ball is pivotally retained, a head fixed on said rod and engaging against one side of said thrust bearing, a nut fixedly carried by the spindle supporting means, a shaft having a threaded portion engaging in said nut and having a portion extending through the guide bearing at the end of the spindle remote from the flange and engaging the remaining side of the thrust bearing, means to rotate the shaft, and a compression spring surrounding said rod and urging said head away from the guide bearing having the flange.

3. In a mechanism of the class described, a tubular spindle having an internal guide bearing at each end, means rotatably supporting said spindle, a slidable thrust bearing in said spindle intermediate its ends, a flange projecting from the guide bearing at one end of the spindle, a saw hub resting against said flange and having hinge connection therewith at one side of said spindle, a rod extending through the guide bearing at the flange provided end of the spindle, a ball on the projecting end of said rod, said hub being provided with a socket wherein said ball is pivotally retained, a head fixed on said rod and engaging against one side of said thrust bearing, a nut fixedly carried by the spindle supporting means, a shaft having a threaded portion engaging in said nut and having a portion extending through the guide bearing at the end of the spindle remote from the flange and engaging the remaining side of the thrust bearing, means to rotate the shaft, a compression spring surrounding said rod and urging said head away from the guide bearing having the flange, and a second compression spring engaging the remaining side of the thrust bearing and the adjacent guide bearing, said second spring being relatively weak and the first spring relatively strong.

IRVING SPECTOR.

REFERENCES CITED

The following references are of record in the file of this patent:

UNITED STATES PATENTS

| Number | Name | Date |
| --- | --- | --- |
| 45,677 | Rogers | Dec. 27, 1864 |
| 429,142 | Millard | June 3, 1890 |
| 591,180 | Thackeray et al. | Oct. 5, 1897 |
| 1,709,649 | Adamson | Apr. 16, 1929 |
| 2,274,923 | Hedgepeth | Mar. 3, 1942 |
| 2,462,022 | Hedman | Feb. 15, 1949 |

FOREIGN PATENTS

| Number | Country | Date |
| --- | --- | --- |
| 111,362 | Sweden | Nov. 9, 1948 |